Nov. 9, 1926. 1,605,919
G. A. BURGESS
DRAIN BOARD AND COVER FOR DISHWASHERS, ETC
Filed April 3, 1925    2 Sheets-Sheet 1
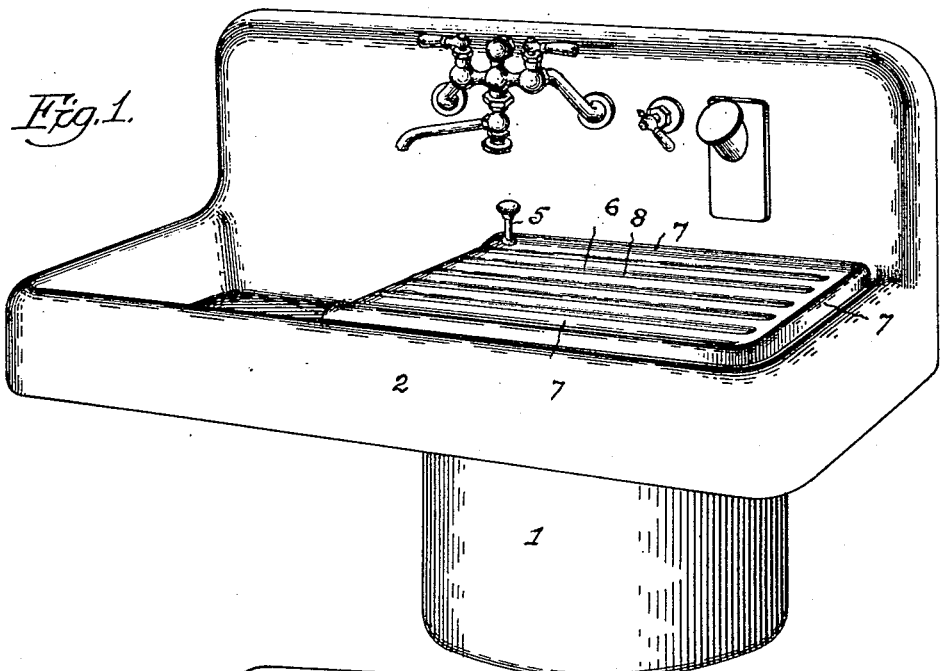
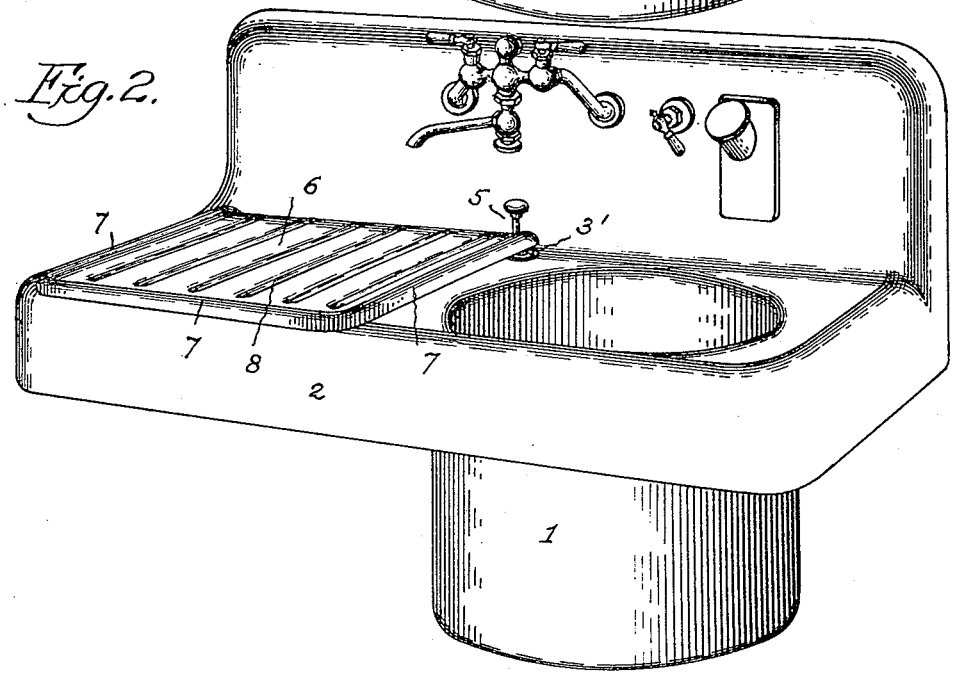
Inventor:
George A. Burgess,
by Robert Burns
Atty.

Nov. 9, 1926.
G. A. BURGESS
1,605,919
DRAIN BOARD AND COVER FOR DISHWASHERS, ETC
Filed April 3, 1925   2 Sheets-Sheet 2
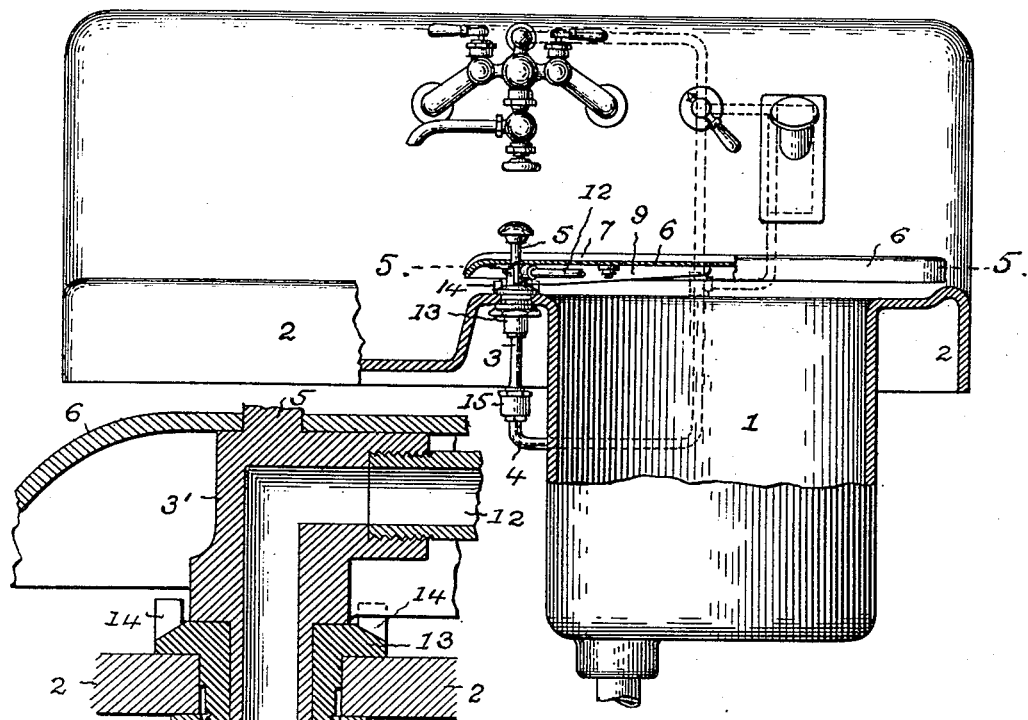
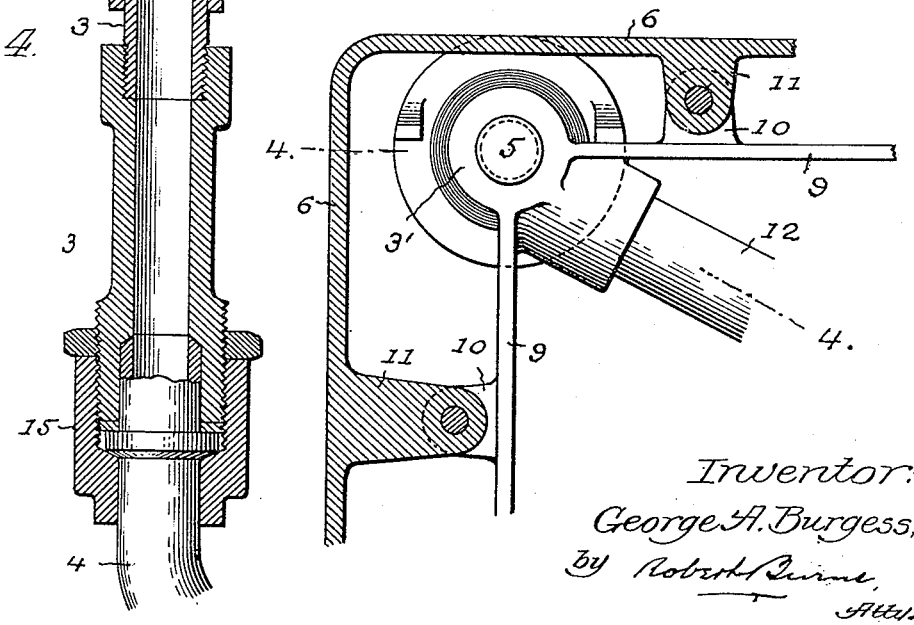
Inventor:
George A. Burgess,
by Robert Burne,
Atty.

Patented Nov. 9, 1926.

1,605,919

UNITED STATES PATENT OFFICE.

GEORGE A. BURGESS, OF WAUKEGAN, ILLINOIS, ASSIGNOR TO CHICAGO HARDWARE FOUNDRY COMPANY, OF NORTH CHICAGO, ILLINOIS, A CORPORATION OF ILLINOIS.

DRAIN BOARD AND COVER FOR DISHWASHERS, ETC.

Application filed April 3, 1925. Serial No. 20,369.

This invention relates to drain boards for dishwashers, kitchen sinks and like household apparatus, and has for its objects:—

To provide a structural formation and combination of parts in which a drain board pivotally associated at one of its corners with the bowl of a dishwasher or like household apparatus, is adapted in one position to act as a cover for the open top of said bowl and in its other position to act as a drain board to receive the dishes as taken from said bowl.

To provide a formation and association of parts whereby the drain board is pivotally attached to and supported by the body or bowl of a dish washer, sink or the like, all as will hereinafter more fully appear.

In the accompanying drawings:

Fig. 1 is a perspective view illustrating the general arrangement of parts in the present invention, with the drain board in position to form a closure for the open top of the dish washer bowl with which it is associated.

Fig. 2 is a similar view, with the drain board shown to one side of the bowl to constitute a drainage support for the dishes taken from said bowl.

Fig. 3 is a longitudinal sectional elevation of the apparatus.

Fig. 4 is an enlarged detail section on line 4—4, Fig. 5.

Fig. 5 is an enlarged horizontal section on line 5—5, Fig. 3.

Like reference numerals indicate like parts in the different views.

In the construction shown, the open top bowl 1 of a household dishwasher is an integral part of the ordinary kitchen sink 2, to constitute an end portion of the same, as set forth in detail in a companion application Serial No. 20,368, and in which a tubular conduit 3, movable in a horizontal plane, and operatively connected to a fixed tubular conduit 4, provides a passage for the supply of wash water to a sprinkler head (not shown) which discharges such water in downward spray upon the dishes, etc., contained in the bowl 1 aforesaid.

In the present improvement the upper end or portion 3' of the movable tubular conduit 3 carries a central upstanding spindle 5, preferably of the headed type shown, and extending above the top of the drain board 6 to provide an additional means of manipulating said board. The portion 3 constitutes one member of the pivotal connecting means between the drain board 6 and the sink body 2 of the structure.

The drain board 6, is preferably of a rectangular shape, provided with a raised margin 7 on three of its sides and with a sunken central portion formed with the usual drain channels or ridges 8 leading to the side of the drain board from which the raised margin is omitted, and over which the drainage water flows into the sink body 2.

The drain board 6 is preferably formed of enamelled plate metal and mounted at one of its corners in pivotal relation to the sink body 2, by a detail formation of parts as follows:—

The upper portion 3' aforesaid of the tubular conduit 3 is formed with a pair of rails 9 in right angle relation one to the other, with said rails provided with lateral orificed ears 10 for fixed attachment to complementary ears 11 on the interior surface of the drain board 6 by bolts or like fastening means. In addition to the rails 9, the aforesaid upper portion of the conduit 3, carries the horizontal pipe 12 for the supply of wash water to the sprinkler head of a dish washer, as fully described in my companion application above referred to.

In the preferred construction shown, the movable tubular conduit 3 is vertically supported in a journal bushing 13 fixedly attached to the sink body 2 and provided with stop lugs 14, which limit the horizontal movement of the drain board, by engagement against one or the other of the rails 9 aforesaid. At its lower end the tubular conduit 3 is connected by a suitable stuffing box 15 with an adjacent end of the fixed tubular conduit 4 aforesaid, so as to have turning connection therewith in a watertight manner.

Having thus fully described my invention, what I claim and desire to secure by Letters Patent, is:—

1. The combination of a sink body, a depending bowl forming a part of said body, a drain board of a flat form associated with said body and bowl, and a vertical pivot connection between the drain board and sink body upon which said drain board has pivotal movement in a horizontal plane to have one surface uppermost at all times and in one position to act as a cover for the bowl and in its other position act as a drain board at one side of the bowl.

2. The combination of a sink body, a depending bowl forming a part of said body, a drain board of a flat form associated with said body and bowl, and a vertical pivot connection between the drain board and sink body upon which said drain board has pivotal movement in a horizontal plane to have one surface uppermost at all times and in one position to act as a cover for the bowl and in its other position act as a drain board at one side of the bowl, the drain board having a rectangular form with its pivot means arranged adjacent to one corner.

3. The combination of a sink body, a bowl forming a part thereof, the body of the sink having an orifice adjacent to the bowl, a journal bushing fitted to said orifice, a drain board, and a head formed with angularly arranged rails for fixed attachment to the under side of the drain board and having a depending circular portion for a journal bearing in the aforesaid bushing.

4. The combination of a sink body, a bowl forming a part thereof, the body of the sink having an orifice adjacent to the bowl, a journal bushing fitted to said orifice, a drain board, and a head formed with rails in right angle relation for attachment to one corner of the drain board, said head having a depending circular portion for a journal bearing in the aforesaid bushing, the drain board having a rectangular form with its pivot means arranged adjacent to one corner.

Signed at North Chicago, Ill., this 31st day of March, 1925.

GEORGE A. BURGESS.